J. Baird,
Steam Engine Slide Valve.

N°38,722. Patented June 2, 1863.

Witnesses:

Inventor:
John Baird

UNITED STATES PATENT OFFICE.

JOHN BAIRD, OF NEW YORK, N. Y.

IMPROVEMENT IN VALVES FOR STEAM-ENGINES.

Specification forming part of Letters Patent No. 38,722, dated June 2, 1863.

*To all whom it may concern:*

Be it known that I, JOHN BAIRD, of the city of New York, in the State of New York, have invented a new and useful Improvement in the Valves of Steam-Engines; and I do hereby declare that the following, taken in connection with the drawings, is a full, clear, and exact description thereof.

Figure 5:
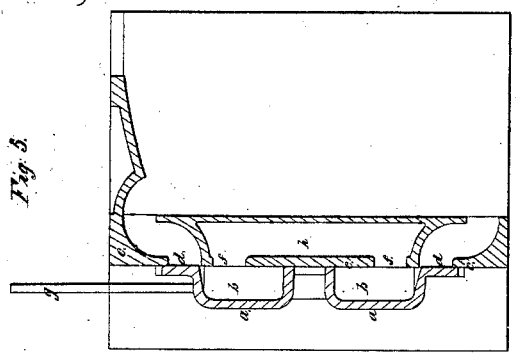
Figure 6:
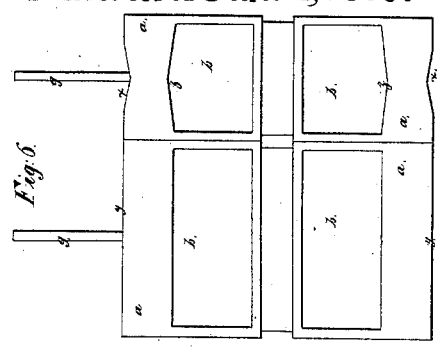
Figure 3:
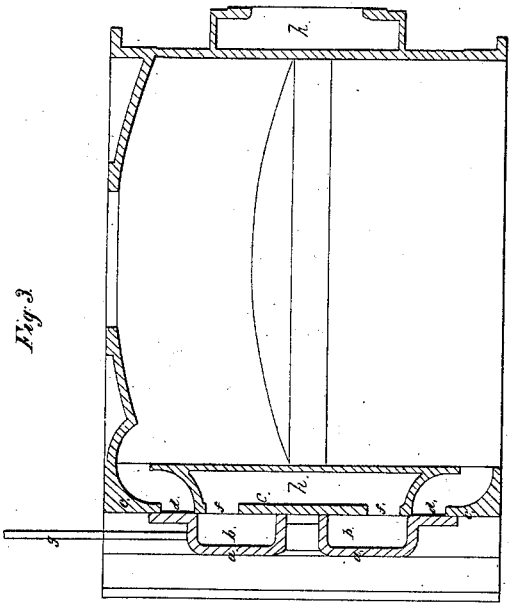
Figure 4:
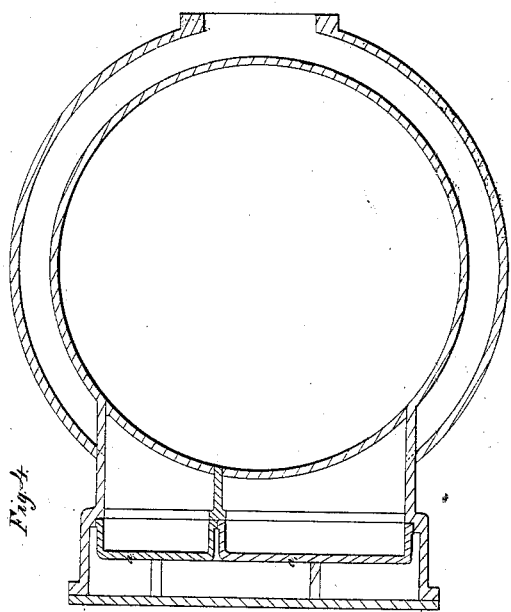
Figure 1:
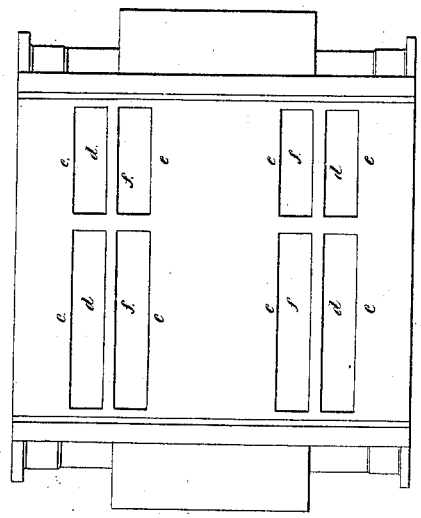
Figure 2:
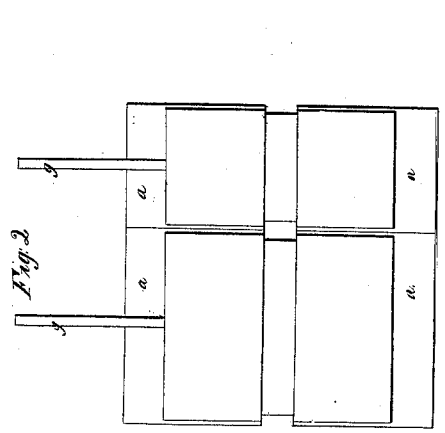

In the drawings, Figure 1 is a plan of the valve-seat. Fig. 2 is a plan of the upper side of the valves. Fig. 3 is a longitudinal section through one of the valves, the seat, and the cylinder. Fig. 4 is a cross-section through both valves, the seat, and the cylinder. Fig. 5 is a longitudinal section through the smaller of the two valves, valve-seat, &c., showing the larger valve in elevation; and Fig. 6 is a plan of both valves, showing the side of them which rests upon the seat.

At the present time engineers have almost universally acquiesced in the conclusion that slide-valves of some kind or other are best adapted to short-stroke fast-moving engines, especially such as are used in propeller-steamers, and are aware of the difficulties encountered in working such valves by hand, even when balanced in the various ways now known. The difficulty of working the large valves used on such engines has been obviated by applying a separate set of small valves to the cylinder, provided with appropriate seats and passages, and with hand-gear only. These valves usually stand on the side of the cylinder opposite the main valves, and their employment, although obviating the difficulty of controlling the engine by hand, introduces other disadvantages. In the first place, they are likely to stick when long out of use; secondly, they increase very materially the original cost of the engine, and, thirdly, they cause useless waste of steam at each stroke in filling the passages leading to them, while at the same time it is necessary that the main or automatic valves shall be as large as if no small valves were used, and provided with full-sized ports and passage-ways. I have to a great extent remedied the second difficulty, and wholly cured the first and third by my invention; and this invention consists in dividing the ordinary main slide in the direction of its line of motion, using both parts thereof to open and close the ports when the engine is running hooked on, and one part only in working the engine by hand; or, in other words, I use two slide-valves, moving side by side in the same chest, with proper passage-ways, and both valves worked by gear when the engine is running, as usual, while one of them is also provided with hand-gear, and can be operated to turn the engine over by hand. As both valves move at once when the engine is hooked on, the area of both valves and both ports is not greater than that of ordinary single valves. There is, therefore, no unnecessary loss of steam in the passages. As both valves are no larger than the ordinary single one, the expense is but little increased, especially as I prefer to place them both in one chest. As both valves move at once, neither can seize or stick fast, and as one only is moved in working by hand, the force employed need be only sufficient to overcome half, or less than half, the resistance impeding the motion of a whole valve. I prefer to make one of the two valves smaller than the other, and to provide the smaller valve with hand-gear.

In the drawings, the valves are shown at $a\ a$, the valve-cups at $b\ b$, the seat at $c\ c$, the steam-ports at $d\ d$, and the exhaust-ports at $f\ f$. The valve-stems are shown at $g\ g$, and the exhaust-passage at $h\ h$. The valves shown in the drawings are of the double-slide variety; with two cups and two exhaust-ports to each; but any sort of slide-valves may be used, balanced or unbalanced, so long as there are two complete valves sliding side by side, or a slide-valve divided longitudinally in the direction of its line of motion. These valves may be operated in any usual or convenient manner, so long as both move when the engine is in motion, and one of them is provided with hand-gear capable of moving it when the other is at rest; and in an engine I am now constructing I move them as follows: I connect both valve-stems to an ordinary rock-shaft, one of them (the smaller) in such manner that it can be disconnected therefrom or moved without moving the rock-shaft, and this rock-shaft I call the "main" rock-shaft. This rock-shaft is worked by an ordinary eccentric with a common hook, and provided with a contrivance for unhooking, and the smaller valve is also secured to a smaller rock-shaft or trip-shaft, capable of being worked by a starting-bar. The main rock-shaft is also provided with a centering-lever, or lever by means of which its position can be changed by hand. If the engine be in motion, and it be required to stop, the engineer unhooks the eccentric-rod, and then centers both valves at once by the main rock-shaft, shifting its lever by hand. When the engine is stopped, he disconnects the smaller valve from the main rock-shaft, and stands by to work the starting-bar of the trip-shaft by hand, causing the engine to back or go ahead by the motion of the smaller valve only. When the orders are to hook on again, the engineer hooks the eccentric onto the main rock-shaft, and the larger valve commences to move, and he then hooks on the smaller valve, or makes the connection between it and the main rock-shaft, and both valves move together.

In starting the engine, the engineer sets it in motion by the small valve, operated by hand, then throws the eccentric hook in, and finally connects the smaller valve to the main rock-shaft. The trip-shaft is small, and may remain connected to the small valve at all times. This division of the main valve also affords peculiar facilities for adjusting the time of exhaust, or the lead thereon, or the lead on the steam, or for graduating the speed of admission of steam when the valve opens, or the speed of exhaust. For instance, one valve may have less lap on either exhaust or steam than the other (see sectional view, Fig. 5) or less lead than the other, or both; or one valve may have inclined edges to uncover the ports, as at $x$, Fig. 6, admitting the steam gradually, and this valve may have at the same time more lead than the other, which has edges parallel to the ports, as at $y$, so as to admit the steam very gradually at first, and then by means of the opening of both valves to keep the cylinder-pressure up to that of the boiler. If the two valves have the same lap, they may have different ranges of motion, thus adjusting either the admission or exhaust of steam. And all these advantages are additional to those already cited, when my plan was contrasted with the old plan of a full-sized automatic valve, and a separate distinct set of valves for backing and starting, worked by hand-gear only. In addition to these adjustments of the entry and exhaust of steam by variation of construction or range of motion of the valves, I intend to make one or both of the edges that open the exhaust inclined, as at $z$, so as to exhaust the steam gradually at first, or to keep both exhausts open at once for a short time, if the exhaust lap be as shown in section at Fig. 5.

I claim as of my own invention—

1. A divided slide-valve for a steam-engine, operating substantially as specified, or, in other words, two slide valves working side by side, both capable of being moved and moving when the engine is hooked on, and one capable of being moved independently by hand, the two working under a mode of operation substantially as hereinbefore set forth.

2. In combination, two valves, operating substantially as specified, when one has less or more lap or lead than the other either on exhaust or steam, substantially as described, and for the purpose specified.

In testimony whereof I have hereunto set my hand, in the city of New York, on this 12th day of March, A. D. 1863.

JOHN BAIRD.

In presence of—
J. M. HALSTED,
DAVID ADEE.